United States Patent
Lindoff et al.

(10) Patent No.: US 10,663,556 B2
(45) Date of Patent: May 26, 2020

(54) VALIDATION OF POSITION INDICATION

(71) Applicant: Telefonaktiebolaget LM Ericsson (publ), Stockholm (SE)

(72) Inventors: Bengt Lindoff, Bjärred (SE); Lars Andersson, Solna (SE); Magnus Åström, Lund (SE); Patrik Ekdahl, Dalby (SE); Fredrik Nordström, Lund (SE); Andres Reial, Malmö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/332,975

(22) PCT Filed: Sep. 28, 2016

(86) PCT No.: PCT/EP2016/073120
§ 371 (c)(1),
(2) Date: Mar. 13, 2019

(87) PCT Pub. No.: WO2018/059676
PCT Pub. Date: Apr. 5, 2018

(65) Prior Publication Data
US 2019/0271757 A1   Sep. 5, 2019

(51) Int. Cl.
*G01S 5/02* (2010.01)
*H04L 29/06* (2006.01)
*H04W 64/00* (2009.01)

(52) U.S. Cl.
CPC ............ *G01S 5/0236* (2013.01); *G01S 5/02* (2013.01); *G01S 5/0226* (2013.01);
(Continued)

(58) Field of Classification Search
CPC .... G01S 5/0236; G01S 5/0226; G01S 5/0242; G01S 5/0263; G01S 5/021; G01S 5/0257;
(Continued)

(56) References Cited

U.S. PATENT DOCUMENTS 9,614,844 B2 *  4/2017  Turner ............... H04L 63/107
2002/0098851 A1  7/2002  Walczak et al.
(Continued)

FOREIGN PATENT DOCUMENTS

EP   1251362 A2   10/2002
EP   2333582 A1   6/2011

*Primary Examiner* — Magdi Elhag
(74) *Attorney, Agent, or Firm* — Coats & Bennett, PLLC

(57) ABSTRACT

A method performed in a server node associated with a cellular communication system is disclosed. The method is for validation of a first position indication of a wireless communication device, wherein the wireless communication device is adapted to operate in connection with the cellular communication system. The first position indication is obtained via the wireless communication device by a first positioning system. The method comprises obtaining a serving cell identification of the wireless communication device, obtaining a second position indication of the wireless communication device based on the serving cell identification, and determining whether the first position indication is valid based on whether a metric based on the first and second position indications meets a validation criterion. In some embodiments, obtaining the serving cell identification of the wireless communication device may comprises receiving a first message, which comprises the serving cell identification, signed by a first signature associated with the serving cell, and verifying the serving cell identification based on the first signature. Corresponding computer program product, arrangement and server node are also disclosed.

11 Claims, 3 Drawing Sheets

(52) U.S. Cl.
CPC ............ *G01S 5/0242* (2013.01); *H04L 63/04* (2013.01); *H04L 63/08* (2013.01); *H04L 63/0815* (2013.01); *H04L 63/0823* (2013.01); *H04L 63/0876* (2013.01); *H04W 64/003* (2013.01)

(58) Field of Classification Search
CPC ... H04W 64/003; H04W 4/023; H04W 4/025; H04L 63/0414; H04L 63/0428; H04L 63/04; H04L 63/08; H04L 63/0815; H04L 63/0823; H04L 63/0876
See application file for complete search history.

(56) References Cited

U.S. PATENT DOCUMENTS

| | | | |
|---|---|---|---|
| 2005/0037775 A1* | 2/2005 | Moeglein | G01S 5/0036 455/456.1 |
| 2006/0079248 A1 | 4/2006 | Otsuka et al. | |
| 2008/0316042 A1 | 12/2008 | Scales | |
| 2010/0205316 A1 | 8/2010 | Xue et al. | |
| 2010/0287038 A1 | 11/2010 | Copejans | |
| 2011/0287779 A1 | 11/2011 | Harper | |
| 2015/0327208 A1* | 11/2015 | Qiu | H04W 12/10 455/456.1 |

* cited by examiner

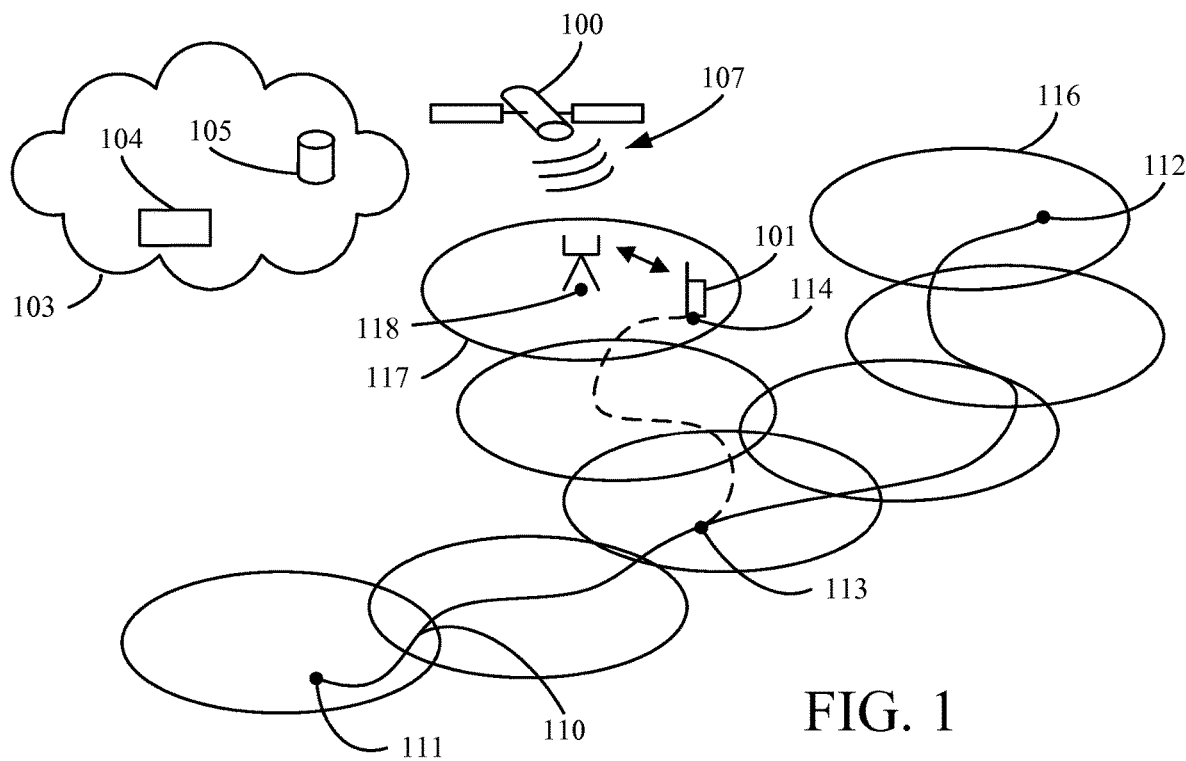
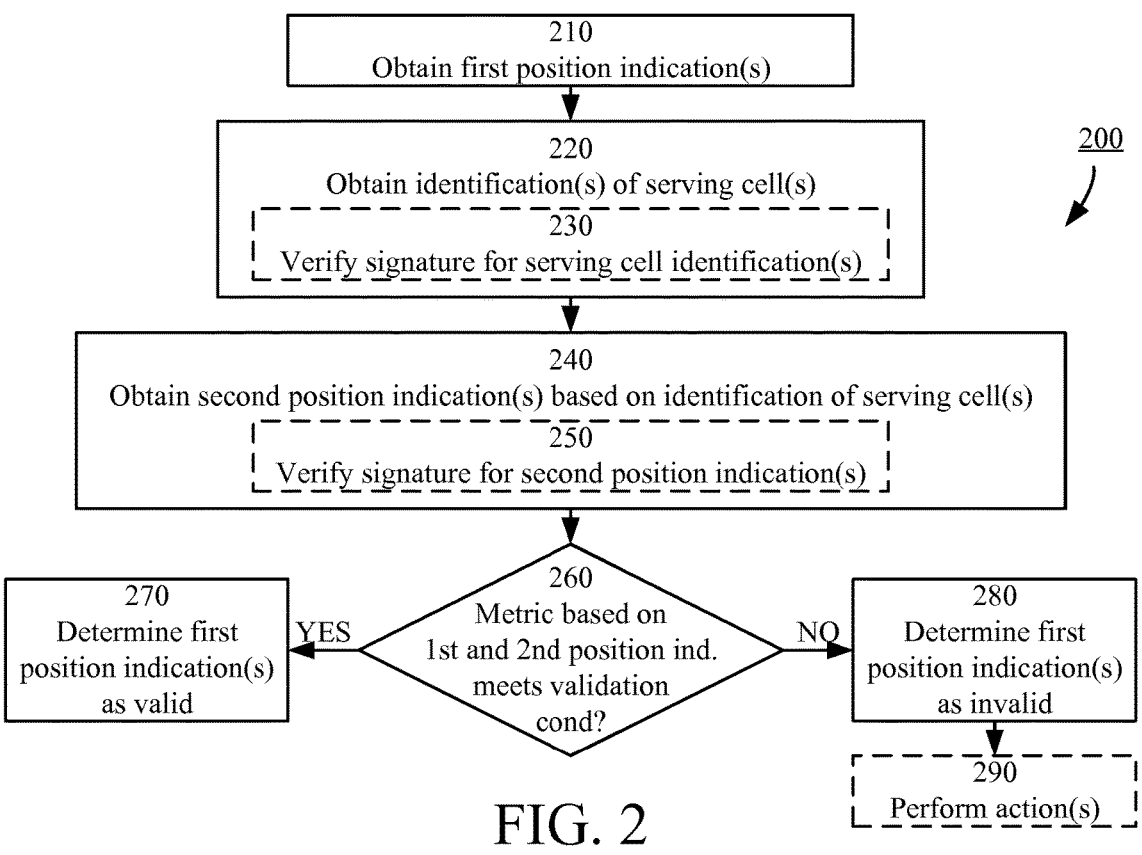
FIG. 2

VALIDATION OF POSITION INDICATION

TECHNICAL FIELD

The present invention relates generally to the field of positioning. More particularly, it relates to validation of position indications that may not be reliable.

BACKGROUND

Global Navigation Satellite Systems (GNSS) comprise several satellite based positioning systems such as, for example, Global Positioning System (GPS), GLObal NAvigation Satellite System (GLONASS), Galileo, etc. Global Navigation Satellite Systems work similarly, typically using triangulation of signals from more than one satellite to estimate the position. Various estimation algorithms may provide accuracy within a few meters, or much higher precision for advanced algorithms.

A wireless communication device can obtain a position indication via GNSS. For example, GNSS-based positioning is often used for navigation, routing directions, and tracking of movement, e.g. of a vehicle. In some applications, an integrated GNSS tracking device may estimate the current position of the device and report it to a control center for monitoring or analysis, which may be in real-time or may be based on recorded data.

Even though they may be accurate in terms of position, GNSS systems suffer from the weakness that the signal may be unreliable. Typically, nothing guarantees the authenticity of a received GNSS signal. Hence, it is possible to significantly manipulate the position estimated by a wireless communication device, for example by using an interfering GNSS signal. Furthermore, a fraudulent or hijacked wireless communication device may, itself, manipulate the position after estimation and before reporting. Similar problems may arise for other types of positioning than those based on GNSS.

Thus, there is a need to determine whether a position estimate is valid. US 2010/0287038 A1 discloses a road toll system comprising a vehicle-mounted unit having a satellite navigation receiver implementing a position tracking function. The system also comprises a sensor for detecting a local vehicle condition dependent on the absolute position of the vehicle. The authenticity of the position tracking information is validated using the sensor information. The sensor may be for detecting mobile telephony signals and may comprise a mobile telephony receiver implementing a position tracking function. The vehicle communicates with a back-end server. However, the back-end server must rely on a smart card in the vehicle performing the validation. Thus, if the smart card is fraudulent, hijacked or otherwise tampered with, the back-end server can still not trust that the position tracking information is valid.

Hence, there is a need for improved validation of position indications.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to solve or mitigate at least some of the above or other disadvantages.

According to a first aspect, this is achieved by a method performed in a server node associated with a cellular communication system. The method is for validation of a first position indication of a wireless communication device, wherein the wireless communication device is adapted to operate in connection with the cellular communication system. The first position indication is obtained via the wireless communication device by a first positioning system.

The method comprises obtaining a serving cell identification of the wireless communication device, obtaining a second position indication of the wireless communication device based on the serving cell identification, and determining whether the first position indication is valid based on whether a metric based on the first and second position indications meets a validation criterion.

The first positioning system may be a satellite based positioning system according to some embodiments, for example, a Global Navigation Satellite System (GNSS). Obtaining the first position indication may be achieved according to any suitable algorithm for GNSS receivers.

Obtaining the serving cell identification may, for example, comprise receiving a message, which comprises the serving cell identification, from the wireless communication device. The wireless communication device may in turn have obtained the serving cell identification (by listening to broadcast signaling or by receiving shared or dedicated signals) from a network node, which provides the serving cell, of the cellular communication system.

The serving cell identification may be accompanied by a time stamp according to some embodiments.

According to some embodiments, the message comprising the serving cell identification may additionally comprise the first position indication obtained by the wireless communication device (at a time corresponding to the time stamp, as applicable). In some embodiments, first position indication is received in a separate message from the wireless communication device.

According to some embodiments, the method may further comprise obtaining one or more neighboring cell identifications of the wireless communication device. Such neighboring cell identifications may, for example, be obtained in association with obtaining the serving cell identification and/or in a similar manner as the serving cell identification. In such embodiments, determining whether the first position indication is valid may be further based on the one or more neighboring cell identifications. For example, the neighboring cell identifications may be used to obtain position indications corresponding to neighboring cell identifications in the database introduced below. Such position indications may then be used to obtain the second position indication. Alternatively or additionally, the neighboring cell identifications may be used in verification of the serving cell identification, as will be described later in this summary.

In some embodiments, the second position indication may be based on a position indication corresponding to the serving cell identification in a database adapted to map cell identifications to position indications. The database may be comprised in, or may be external to, the server node.

Obtaining the second position indication based on the serving cell identification may, for example, comprise looking up the position indication corresponding to the serving cell identification in the database.

Obtaining the second position indication based on the serving cell identification may, for example, comprise transmitting the serving cell identification to a node comprising the database and, in response thereto, receiving the position indication corresponding to the serving cell identification in the database.

The position indication corresponding to the serving cell identification in the database may be used directly as the second position indication. Alternatively, the position indication corresponding to the serving cell identification in the database may be used after modification as the second position indication. Such modification may be any suitable modification, for example, a refinement. The modification may comprise combining (e.g. using triangulation) the position indication with position indications corresponding to neighboring cell identifications. Alternatively or additionally, the modification may comprise using knowledge of one or more other parameters (e.g. received signal strength, round trip time, etc.) to refine the position indication.

Determining whether the first position indication is valid may, for example, comprise determining that the first position is valid if the metric meets the validation criterion and determining that the first position is invalid if the metric does not meet the validation criterion.

Determining whether the first position indication is valid may, in some embodiments, comprise comparing the metric to a threshold. The validation criterion may, for example, comprise the metric being less than the threshold.

According to some embodiments, obtaining the second position indication may comprise obtaining a plurality of second position indications at different points in time.

Similarly, obtaining the first position indication and/or obtaining the serving cell identification (and possibly neighboring cell identifications) may, additionally or alternatively, be repeated at different points in time.

Different points in time may be any suitable different point in time, e.g. sequential, periodical, event triggered, etc.

Such information relating to different points in time may, for example, be used to monitor whether the wireless communication device follows a certain path.

Alternatively or additionally, they may be used to make the validation more robust. For example, the validation criterion may comprise the metric being less than the threshold in a number of comparisons relating to consecutive different points in time, and/or the validation criterion may comprise the metric departing from the value of the threshold as time elapses.

In some embodiments, the metric may comprise a distance measure based on the first and second position indications, for example, a Euclidean distance between the first and second position indications.

When information relating to different points in time is available, the metric may be based on a collection of that information (e.g. a plurality of second position indications). For example, the metric may comprise a vector of distance measures where each element relates to one of the different points in time. Other possibilities include, but are not limited to, the metric comprising an overall distance measure (e.g. using a least mean square approach, filtering, or the like, in relation to the different points in time).

When position indications corresponding to neighboring cell identifications are available, the metric may be based on such position indications. For example, such position indications may be used to refine the second position indication as explained above. Alternatively or additionally, the metric may comprise a vector of distance measures where each element relates to a distance measure for the first position indication and either the second position indication or a position indication corresponding to a neighboring cell. Other possibilities include, but are not limited to, the metric comprising an overall distance measure (e.g. using a least mean square approach, filtering, or the like, in relation to the neighboring cell information).

If the first position indication is determined to be invalid one or more of a collection of actions may be performed according to some embodiments. Such a collection may, for example, comprise one or more of:

Reporting that the first position indication is determined to be invalid to the wireless communication device.

Reporting that the first position indication is determined to be invalid to another server node associated with the cellular communication system.

Reconfiguring the connection for the wireless communication device.

Deactivating (at least part of) the wireless communication device.

Resetting (at least part of) the wireless communication device. For example, user data may be erased.

Deactivating equipment associated with the wireless communication device, e.g. the engine of a vehicle carrying the wireless communication device.

In some embodiments, it may be desirable to verify that the (serving and/or neighboring) cell identifications are reliable.

According to some embodiments, this may be achieved if obtaining the serving cell identification of the wireless communication device comprises receiving a first message which comprises the serving cell identification, signed by a first signature associated with the serving cell, and verifying the serving cell identification based on the first signature. Neighboring cell identifications may be verified similarly.

Typically, a network node, providing the cell under consideration, signs the corresponding cell identification (and possibly an associated time stamp) using a signing key which is not known to the wireless communication device. The signed information is sent to the wireless communicating device, which includes it in the first message and transmits the first message to the server node, which extracts the information there from.

In one typical scenario, the signing key is a symmetric key. To verify the signed information, the server node may, in some embodiments, transmit the extracted information and the signed information to a verification node (who is in possession of the symmetric key) and receive an answer indicating whether or not the signed information corresponds to the extracted information when signed by the signing key. In such an alternative, the serving node typically does not have access to the symmetric key.

In one typical scenario, the signing key is a private key of a private/public key pair. The server node may, in some embodiments, verify whether or not the signed information corresponds to the extracted information when signed by the signing key.

To perform this verification, the server node may be in possession of the public key of the private/public key pair. The server node may have requested and received the public key from another node earlier or it may request and receive it as part of the verification process. Alternatively, the public key is included in the first message as a certificate, signed by a root certificate known to the server node.

Another (alternative or additional) approach to cell identification verification may comprise determining whether the serving cell identification and one or more neighboring cell identifications correspond to adjacent (or otherwise neighboring) cells according to the deployment of the cellular communication system. Steps according to this approach may be performed before, after, or instead of the steps described above for cell identification verification.

For this purpose, the server node may use a database comprising information regarding which cells of the cellular communication system are adjacent or otherwise neighboring. Such a database may be the same as, or different from, the database mentioned above. Furthermore, it may be comprised in, or may be external to, the server node.

If the verification of the (serving or neighboring) cell identification fails, one or more of a collection of actions may be performed according to some embodiments. Such a collection may, for example, comprise one or more of:

Aborting the validation of the first position indication.
Reporting the verification failure of the cell identification to the wireless communication device.
Reporting the verification failure of the cell identification to another server node associated with the cellular communication system.
Reconfiguring the connection for the wireless communication device.
Deactivating (at least part of) the wireless communication device.
Resetting (at least part of) the wireless communication device. For example, user data may be erased.
Deactivating equipment associated with the wireless communication device, e.g. the engine of a vehicle carrying the wireless communication device.
Requesting that the wireless communication device sends a new cell identification report.
Requesting the wireless communication device to report a cell identification of another cell that the wireless communication device can receive signals from, e.g. after handover to that other cell or via listening to broadcast information.
Requesting the wireless communication device to report a cell identification of another cellular communication system that the wireless communication device can receive signals from, e.g. after routing to that other cellular communication system or via listening to broadcast information.

In some embodiments, it may be desirable to verify that the second position indication (and/or position indications corresponding to the serving and/or neighboring cells) is reliable. This approach may be particularly relevant when a database mapping cell identification to position indications is external to the serving node, and/or when a node responsible for modification of the position indication corresponding to the server cell identification is external to the serving node. It may also be particularly relevant if the information passes one or more un-trusted nodes before reaching the server node.

According to some embodiments, this may be achieved if obtaining the second position indication of the wireless communication device based on the serving cell identification comprises receiving a second message which comprises the second position indication, signed by a second signature associated with a source node of the second position indication, and verifying the second position indication based on the second signature. Other position indications may be verified similarly.

Typically, a node providing the position indication under consideration signs the position indication using a signing key. The signed information is included in the second message and transmitted to the server node, which extracts the information there from.

In one typical scenario, the signing key is a symmetric key. To verify the signed information, the server node may, in some embodiments, transmit the extracted information and the signed information to a verification node (who is in possession of the symmetric key) and receive an answer indicating whether or not the signed information corresponds to the extracted information when signed by the signing key. In such an alternative, the serving node typically does not have access to the symmetric key.

In one typical scenario, the signing key is a private key of a private/public key pair. The server node may, in some embodiments, verify whether or not the signed information corresponds to the extracted information when signed by the signing key.

To perform this verification, the server node may be in possession of the public key of the private/public key pair. The server node may have requested and received the public key from another node earlier or it may request and receive it as part of the verification process. Alternatively, the public key is included in the second message as a certificate, signed by a root certificate known to the server node.

If the verification of the position indication fails, one or more of a collection of actions may be performed according to some embodiments. Such a collection may, for example, comprise one or more of:

Aborting the validation of the first position indication.
Reporting the verification failure of the position indication to the wireless communication device.
Reporting the verification failure of the position indication to another server node associated with the cellular communication system.
Changing source node for obtaining second (and possibly other) position indications.

A second aspect is a computer program product comprising a computer readable medium, having thereon a computer program comprising program instructions, the computer program being loadable into a data-processing unit and adapted to cause execution of the method according to the first aspect when the computer program is run by the data-processing unit.

A third aspect is an arrangement (system, device, unit) for incorporation in a server node associated with a cellular communication system. The arrangement is for validation of a first position indication of a wireless communication device, wherein the wireless communication device is adapted to operate in connection with the cellular communication system. The first position indication is obtained via the wireless communication device by a first positioning system.

The arrangement comprises a controller adapted to cause obtaining of a serving cell identification of the wireless communication device, obtaining of a second position indication of the wireless communication device based on the serving cell identification, and determination of whether the first position indication is valid based on whether a metric based on the first and second position indications meets a validation criterion.

Obtaining the serving cell identification may be achieved by a receiver of the server node. Obtaining the second position indication may be achieved by a receiver of the server node (e.g. if a database adapted to map cell identifications to position indications is external to the server node) or by a database adapted to map cell identifications to position indications (e.g. if such database is comprised in the server node).

In some embodiments, the arrangement may further comprise a database adapted to map cell identifications to position indications, and the controller may be further adapted to obtain (e.g. perform look-up and possible modifications) the second position indication based on a position indication corresponding to the serving cell identification in the database.

Determination of whether the first position indication is valid may be achieved by a validator. The validator may, for example, be adapted to calculate the metric and compare it to a threshold as elaborated on above.

In some embodiments, the controller may be adapted to cause obtaining of the serving cell identification of the wireless communication device by causing reception of a first message which comprises the serving cell identification, signed by a first signature associated with the serving cell, and verification of the serving cell identification based on the first signature.

In some embodiments, the controller may be adapted to cause obtaining of the second position indication of the wireless communication device based on the serving cell identification by causing reception of a second message which comprises the second position indication, signed by a second signature associated with a source node of the second position indication and verification of the second position indication based on the second signature.

The verification of the serving cell identification and/or the second position indication may be achieved by one or more verifiers and/or a transceiver of the server node.

A fourth aspect is a server node for a cellular communication system, the server node comprising the arrangement of the third aspect.

In some embodiments, any of the above aspects may additionally have features identical with or corresponding to any of the various features as explained above for any of the other aspects.

An advantage of some embodiments is that validation of a first position indication may be achieved. Another advantage of some embodiments is that the validation approach is simple. Another advantage of some embodiments is that the validation approach is robust. For example, it does not depend on trusted parts of the wireless communication device.

BRIEF DESCRIPTION OF THE DRAWINGS

Further objects, features and advantages will appear from the following detailed description of embodiments, with reference being made to the accompanying drawings, in which:

FIG. 1 is a schematic drawing illustrating a scenario where some embodiments may be applicable;

FIG. 2 is a flowchart illustrating example method steps according to some embodiments;

DETAILED DESCRIPTION

Figure 3:
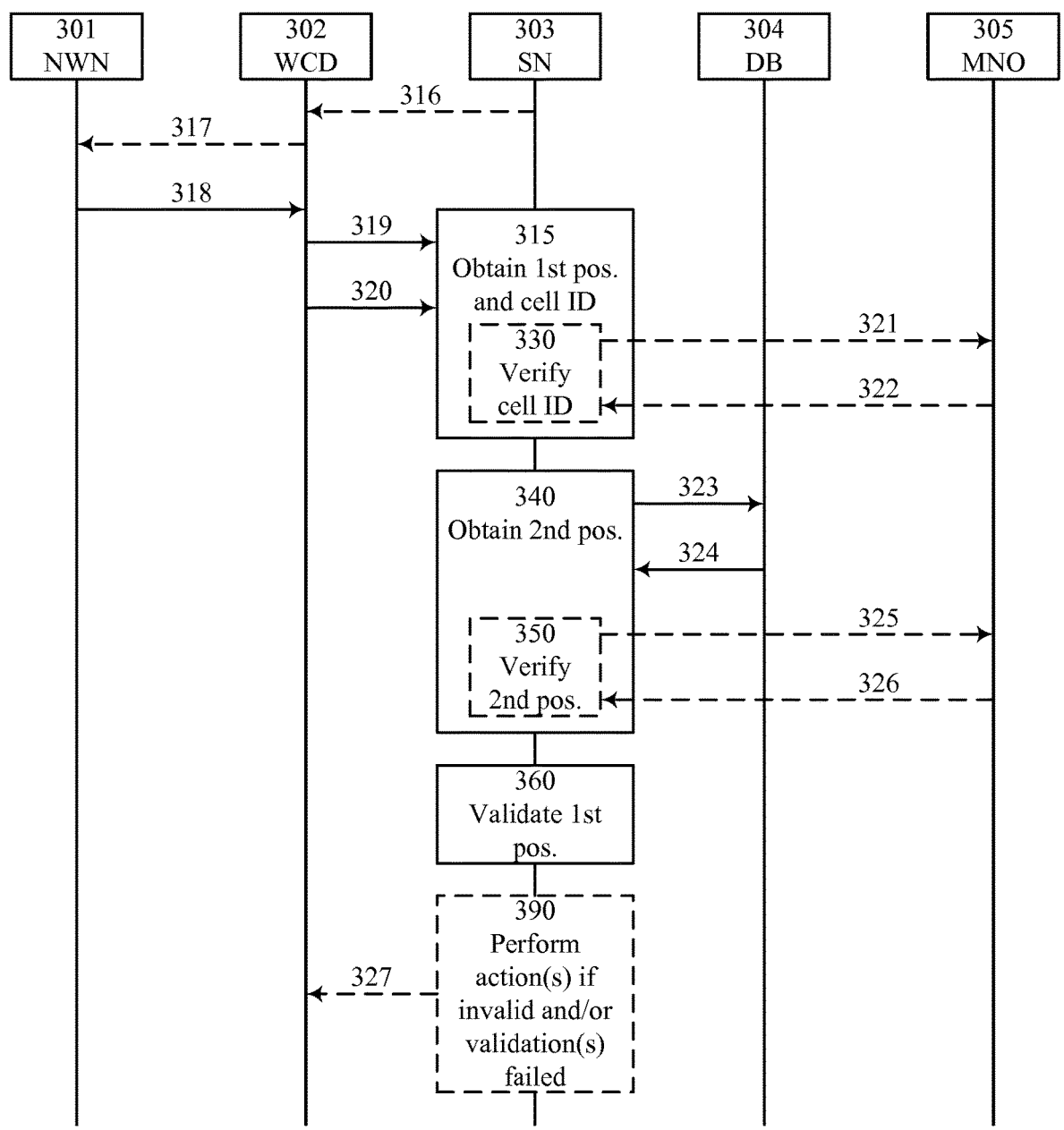
FIG. 3 is a combined flowchart and signaling diagram illustrating example method steps and signaling according to some embodiments.

As elaborated on above, a position indication of a wireless communication device, which is provided to a server node via the wireless communication device may not be reliable.

In the following, embodiments will be described where validation of such position indications (e.g. GNSS position indications) is achieved.

The validation uses a correlation between the position indication to be validated (the first position indication) and another position indication (the second position indication).

The other position indication is obtained by mapping a cell identification of a serving cell of the wireless communication device to a position indication (that may be used directly for comparison with the position indication to be validated, or that may first be modified).

The reliability of the validation is ensured in that the wireless communication device is not involved in the mapping. In some embodiments, the second position indication (mapping and/or modifications) undergoes verification before it is trusted. Further reliability may be achieved, in some embodiments, by verification of the (serving and/or neighboring) cell identification.

FIG. 1 illustrates a scenario where some embodiments may be applicable. A wireless communication device 101 starts at location 111 and is meant to travel along a path 110 to another location 112. However, for some reason, the wireless communication device 101 deviates from the path 110 at location 113 and follows another path to location 114.

The wireless communication device 101 is equipped with a GNSS-based positioning system and estimates its position based on signals 107 from satellites of the GNSS (represented here by a satellite 100). The wireless communication device 101 reports its position estimated via the GNSS to a server node 104 for tracking.

If the deviation from the path 110 at location 113 was due to malicious activity, tampering with the wireless communication device 101 and/or provision of false interfering GNSS signals, this may result in reporting of position 112 (or another position away from the true location 114) such that the server node does not realize that the wireless communication device 101 has deviated from the path 110 (and/or cannot know the actual location 114 of the wireless communication device 101).

According to some embodiments, the wireless communication device 101 also reports the cell identification (e.g. cellID) of the serving cell to the server node. In some embodiments, the cell identification is safeguarded by a signature not known to the wireless communication device. Alternatively or additionally, the wireless communication device 101 also reports the cell identification of the neighboring cells to the server node to strengthen the reliability of the serving cell identification. The serving cell identification is mapped, in a database 105, to a position indication which corresponds to the location of the network node providing the serving cell.

Thus, when the wireless communication device 101 is at location 114, it reports the cell identification of its serving cell 117, along with its false GNSS position 112, to the server node 104. The server node maps (in the database 105) the cell identification to a location 118 associated with the cell identification of the serving cell 117. When comparing the location 118 with the false GNSS position 112, the server node may detect that the position 112 is not close enough to the location 118 (e.g. not in the cell 116 comprising the position 112) and may, hence invalidate the false GNSS position 112.

In some scenarios comprising a more sophisticated attack, the wireless communication device 101, when at location 114, may report (along with its false GNSS position 112) a fraudulent cell identification claiming that the cell 116 is the serving cell. Such a fraudulent cell identification may, for example, originate from the wireless communication device 101 itself or from a fraudulent network node. According to some embodiments, the server node may be adapted to detect that the fraudulent cell identification is not correctly signed by the network node providing the true serving cell 116 and to consequently invalidate the false GNSS position 112.

Invalidation of the second position indication may be interpreted as the location of the wireless communication device being unknown or being known to be untrustworthy.

The server node 104 and the database 105 may, for example, be comprised in a cloud service 103 as illustrated in FIG. 1, or otherwise associated with the cellular communication system. Generally, the database has some association with the operator providing the cellular communication system, such that cell identities may be mapped to position indications (e.g. of locations of the network nodes providing the respective cells or of another suitable location relating to the respective cells).

FIG. 2 illustrates an example method 200 performed in a server node associated with a cellular communication system according to some embodiments. The method 200 may, for example, be performed by the server node 104 of FIG. 1.

The method 200 is for validation of a first position indication of a wireless communication device (compare with wireless communication device 101 of FIG. 1) adapted to operate in connection with the cellular communication system.

In step 210, the first position indication is obtained. Typically, the first position indication is obtained by receiving it from the wireless communication device, which in turn has estimated it using a first positioning system (e.g. GNSS).

In step 220 a serving cell identification of the wireless communication device is obtained. Typically, the serving cell identification is obtained by receiving it from the wireless communication device, which in turn has received it from the network node providing the serving cell. As illustrated by optional sub-step 230, the serving cell identification may be verified using either or both of a signature of the network node providing the serving cell and neighboring cell identifications.

In step 240 a second position indication of the wireless communication device is obtained based on the serving cell identification. Typically, the second position indication is obtained by using a database to map the serving cell identification to a corresponding position indication. As illustrated by optional sub-step 250, the second position indication may be verified using a signature of the node comprising the database.

Then, it is determined whether the first position indication is valid based on whether a metric based on the first and second position indications meets a validation criterion, as illustrated in step 260. If the metric meets the validation criterion (YES-path out from step 260), the first position indication is determined as valid in step 270. If the metric does not meet the validation criterion (NO-path out from step 260), the first position indication is determined as invalid in step 280. Optional step 290 illustrates that various actions may be performed in response to determining that the first position indication is invalid.

FIG. 3 illustrates an example method performed in a server node (SN) 303 associated with a cellular communication system and related example signaling according to some embodiments. The method is for validation of a first position indication of a wireless communication device (WCD) 302 and may be compared with the method 200 presented in FIG. 2. Details and examples described in connection to any of the FIGS. 2 and 3 may be equally applicable, alone or in combination with other details or examples, in the context of the other one of FIGS. 2 and 3.

The entities between which the example signaling of FIG. 3 takes place are a network node (NWN) 301 of the cellular communication system, the wireless communication device (WCD) 302 adapted to operate in connection with the cellular communication system, the server node (SN) 303, a database (DB) 304 (which may be comprised in, or external to, the server node 303), and a node of a mobile network operator (MNO) 305. For example, the server node (SN) 303 may correspond to the server node 104 of FIG. 1, the wireless communication device (WCD) 302 may correspond to the wireless communication device 101 of FIG. 1, and the database (DB) 304 may correspond to the database 105 of FIG. 1. Of course, the signaling between nodes is schematically illustrated and may take any suitable route via other nodes of suitable communication networks as applicable.

The signaling may commence with the server node sending a request 316 to the wireless communication device, asking it to report its location. Alternatively or additionally, the wireless communication device may report its location at predetermined times (e.g. periodically) or as triggered by certain events (e.g. cell handover/reselection).

The location of the wireless communication device is obtained by the wireless communication device via some positioning system, e.g. a satellite based positioning system, such as a GNSS.

The request and/or reporting may be according to a suitable protocol. Typically, the protocol may implement reporting serving cell identification in association with location reports, such that a request for location is in implicit request for serving cell identification. Numerous variations are possible, for example, reporting location without serving cell identification as a default approach (possibly without having been requested to do so as exemplified above) and reporting location with serving cell identification on request.

The wireless communication device may send a request 317 for the cell identification to the (serving) network node. Alternatively or additionally, the network node may transmit its cell identification at predetermined times (e.g. periodically in a broadcast message) or as triggered by certain events (e.g. cell handover/reselection, registration, etc.).

In any case, the network node communicates its cell identification to the wireless communication device as illustrated by 318, and the wireless communication device reports the cell identification and the first position indication to the server node as illustrated by 319 and 320, respectively. The cell identification and the first position indication may be reported in different messages as illustrated in FIG. 3, or they may be included in a single message.

Each of the cell identification and the first position indication may be associated with a respective time stamp, which may be particularly useful when they are reported in different messages. The time stamps provide a means to determine which first position indication is to be validated based on which serving cell identification, i.e. they should have corresponding time stamps. Generally, the time stamps do not have to denote the exact same time, but the time elapsed between the time stamps should meet some time stamp criterion (e.g. be less than a maximum elapsed time). Furthermore, the time stamping may make it more difficult to maliciously manipulate the first position indication and/or the serving cell identification.

Thus, in step 315, the first position indication and the serving cell identification are obtained by receiving them from the wireless communication device (compare with steps 210 and 220 of FIG. 2).

In step 340 a second position indication of the wireless communication device is obtained from the database 304 based on the serving cell identification (compare with step 240 of FIG. 2). The server node may, for example, send a prompt 323 comprising the serving cell identification to the database, which sends a response 324 comprising the position indication that corresponds to the serving cell identification. If the database is comprised in the server node, the signaling 323, 324 is, of course, internal signaling of the server node.

In step 360, it is determined whether the first position indication is valid or not (compare with steps 260, 270, 280 of FIG. 2). The determination is based on whether a metric based on the first and second position indications meets a validation criterion (compare with step 260 of FIG. 2). If the metric meets the validation criterion the first position indication is determined as valid, and if the metric does not meet the validation criterion the first position indication is determined as invalid.

Determining whether the first position indication is valid may, for example, comprise comparing the metric to a threshold. The value of the threshold may be static (e.g. predetermined) or dynamic (e.g. possible to set depending on the desired probabilities of false alarm and missed detection of an invalid first position indication).

The validation criterion may, for example, comprise the metric being less than the threshold (or vice versa depending on the metric applied). Thus, if the metric is less than the threshold the first position indication is determined as valid, and if the metric is not less than the threshold the first position indication is determined as invalid.

The metric may, for example, comprise any suitable distance measure (Euclidean distance, Mahalanobis distance, etc.) based on the first and second position indications.

Optional step 390 illustrates that various actions may be performed in response to determining that the first position indication is invalid (compare with step 290 of FIG. 2). Example actions include:
  Reporting that the first position indication is determined to be invalid to the wireless communication device, as illustrated by 327.
  Reporting that the first position indication is determined to be invalid to another server node associated with the cellular communication system.
  Reconfiguring the connection for the wireless communication device.
  Deactivating (at least part of) the wireless communication device.
  Resetting (at least part of) the wireless communication device. For example, user data may be erased.
  Deactivating equipment associated with the wireless communication device, e.g. the engine of a vehicle carrying the wireless communication device.

In some embodiments, step 315 may be extended so that one or more neighboring cell identifications are also obtained. Alternatively or additionally, step 315 may be extended so that a plurality of serving cell identifications is obtained, each at a different point in time.

Then, step 340 may be extended to obtain the second position indication based on the plurality of serving cell identifications and/or on the neighboring cell identifications. This may result in a single second position indication (e.g. the position indication corresponding to the serving cell identification modified based on the other cell identifications, using triangulation and/or other suitable approaches), or several second position indications (e.g. one for each of the cell identifications).

When several second position indications, corresponding to different points in time, are obtained in step 340 they can, for example, be used to monitor whether the wireless communication device follows a certain path. In some embodiments, one or more of the actions in step 390 may be postponed until several consecutive first position estimates have been invalidated.

Alternatively or additionally, several second position indications corresponding to different points in time may be used to make the validation in step 360 more robust. For example, several thresholds with different values may be applied and if a first position indication is invalid in relation to a relatively low threshold value an early warning of departure from the path may be concluded, while if a first position indication is invalid in relation to a relatively high threshold value departure from the path may be definitely concluded. Different actions in step 390 may relate to early warnings, definite conclusion, and other possible levels of invalidity determination.

Yet alternatively or additionally, several second position indications corresponding to different points in time and/or to neighboring cell identifications may be used to determine an overall distance measure (e.g. using a least mean square approach, filtering, or the like), i.e. an overall metric value that may then be exposed to the validation criterion.

In some embodiments, it may be desirable to verify that the (serving and/or neighboring) cell identifications are reliable, i.e. the information sent from the wireless communication device in signaling 319. As illustrated by optional sub-step 330 (compare with sub-step 230 of FIG. 2), cell identifications may be verified using either or both of neighboring cell identifications and a signature of the network node.

In the first case, the verification step 330 may comprise sending 321 a collection of cell identifications (that the wireless communication device reports as corresponding to cells being in geographical vicinity of each other) to a node that checks whether the collection of cell identities corresponds to cells that are really in geographical vicinity of each other, and responds accordingly 322. Such a node may be associated with the mobile network operator as illustrated in FIG. 3, or it may be internal to the server node (e.g. in the form of a database).

In the second case, the cell identification (and possibly the corresponding time stamp) is signed by the network node in signaling 318, using a signature that is not known to the wireless communication device. Hence, signaling 319 represents a message which comprises the cell identification signed by a signature associated with the cell under consideration. The verification step 330 may then comprise sending 321 the message (and possibly the cell identification) to a node that checks (based on the signature) whether the message is reliable, and responds accordingly 322. Such a node may be associated with the mobile network operator as illustrated in FIG. 3, or it may be internal to the server node (e.g. if the server node has information in relation to the signature for performing the verification).

If the verification of the (serving or neighboring) cell identification fails in step 330, one or more of the following actions may be performed:
  Aborting the validation of the first position indication.
  Reporting the verification failure of the cell identification to the wireless communication device.

Reporting the verification failure of the cell identification to another server node associated with the cellular communication system.

Reconfiguring the connection for the wireless communication device.

Deactivating (at least part of) the wireless communication device.

Resetting (at least part of) the wireless communication device. For example, user data may be erased.

Deactivating equipment associated with the wireless communication device, e.g. the engine of a vehicle carrying the wireless communication device.

Requesting that the wireless communication device sends a new cell identification report.

Requesting the wireless communication device to report a cell identification of another cell that the wireless communication device can receive signals from, e.g. after handover to that other cell or via listening to broadcast information.

Requesting the wireless communication device to report a cell identification of another cellular communication system that the wireless communication device can receive signals from, e.g. after routing to that other cellular communication system or via listening to broadcast information.

In some embodiments, it may be desirable to verify that the second position indication (and/or position indications corresponding to the serving and/or neighboring cells) is reliable, i.e. the information sent from the database in signaling 324. As illustrated by optional sub-step 350 (compare with sub-step 250 of FIG. 2), the second position indication may be verified using a signature of the node comprising the database.

This approach may be particularly relevant when a database mapping cell identification to position indications is external to the serving node, and/or when a node responsible for modification of the position indication corresponding to the server cell identification is external to the serving node. It may also be particularly relevant if the information passes one or more un-trusted nodes before reaching the server node.

Similarly to the verification of the cell identification, the second position indication is signed by the database (or the node comprising the database) in signaling 324, using a signature that is not known to nodes that relay the signal 324. The verification step 350 may then comprise sending 325 the message received in 324 (and possibly the second position indication) to a node that checks (based on the signature) whether the message is reliable, and responds accordingly 326. Such a node may be associated with the mobile network operator as illustrated in FIG. 3, or it may be internal to the server node (e.g. if the server node has information in relation to the signature for performing the verification).

If the verification of the second position indication fails in step 350, one or more of the following actions may be performed:

Aborting the validation of the first position indication.

Reporting the verification failure of the position indication to the wireless communication device.

Reporting the verification failure of the position indication to another server node associated with the cellular communication system.

Changing source node for obtaining second (and possibly other) position indications.

Figure 4:
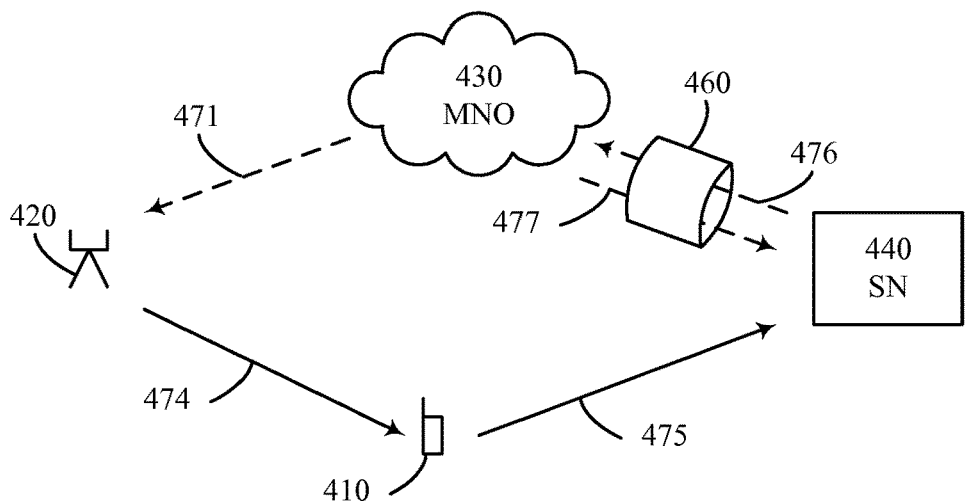
FIG. 4 is a schematic drawing illustrating example logic signaling according to some embodiments.

FIG. 4 illustrates example logic signaling according to the embodiments where a cell identification is verified using a signature of the network node. Details and examples described in connection to FIG. 4 may be equally applicable, alone or in combination with other details or examples, in the context of any of FIGS. 2 and 3.

The entities between which the example signaling of FIG. 4 takes place are a network node 420, a wireless communication device 410, a server node (SN) 440, a database (DB) 450 (which may be comprised in, or external to, the server node 440), and a node of a mobile network operator (MNO) 430. For example, the server node 400 may correspond to the server node 104 of FIG. 1 or the server node 303 of FIG. 3, the wireless communication device 410 may correspond to the wireless communication device 101 of FIG. 1 or the wireless communication device 302 of FIG. 3, the network node 402 may correspond to the network node 301 of FIG. 3, the MNO 430 may correspond to the MNO 305 of FIG. 3, and the database 450 may correspond to the database 105 of FIG. 1 or the database 304 of FIG. 3.

Of course, the signaling between nodes is schematically illustrated and may take any suitable route via other nodes of suitable communication networks as applicable.

Typically, the network node 420 providing the cell under consideration signs the corresponding cell identification (and possibly an associated time stamp) using a signing key which is not known to the wireless communication device 410. The signed information is sent 474 to the wireless communicating device, which transmits 475 the signed information in a message to the server node 440. The server node can then extract the information from the message and verify whether or not it is reliable.

There may be various ways to implement this functionality, whereof two (symmetric key and private/public key pair) will be described with reference to the signaling of FIG. 4.

In the case of a symmetric key, the key may be distributed by the MNO to the network node 420, as illustrated by 471. Thus, the key is shared by the MNO and the network node in this scenario.

When the cell identification (and possibly the time stamp) is to be sent from the network node to the wireless communication device 410 (compare with 318 of FIG. 3), the network node signs the information using the symmetric key before transmission 474 to the wireless communication device.

The signed information is relayed by the wireless communication device, and sent 475 (possibly together with the position indication to be validated) to the server node (compare with 319 of FIG. 3). Since the wireless communication device 410 does not know the symmetric key, successfully tampering with the cell identification and/or the time stamp is quite difficult for the wireless communication device or for an interferer of the wireless communication device.

The server node sends a query 476 (compare with 321 of FIG. 3) to the MNO regarding whether the information it extracts from the message (i.e. cell identification and possibly time stamp) correspond to the signed information. The MNO, which is in possession of the symmetric key, can verify whether this is the case and responds accordingly, as illustrated by 477 (compare with 322 of FIG. 3). Typically, the communication between the server node and the MNO takes place over a secure channel 460, which may be set up for each query or may be more permanent.

In the case of a private/public key pair, at least the private key is known to the network node 420 (possibly distributed at some point by the MNO as illustrated by 471). The public key is, of course, known to the MNO. The MNO may keep a record of which public key belongs to which network node.

When the cell identification (and possibly the time stamp) is to be sent from the network node to the wireless communication device 410 (compare with 318 of FIG. 3), the network node signs the information using the symmetric key before transmission 474 to the wireless communication device.

The signed information is relayed by the wireless communication device, and sent 475 (possibly together with the position indication to be validated) to the server node (compare with 319 of FIG. 3). Since the wireless communication device 410 does not know the private key, successfully tampering with the cell identification and/or the time stamp is quite difficult for the wireless communication device or for an interferer of the wireless communication device.

In this scenario, the server node can either ask the MNO for verification as in the scenario with symmetric keys, or it may send a request 476 (compare with 321 of FIG. 3) to the MNO asking for the public key. In the latter case, the MNO responds by providing the public key as illustrated by 477 (compare with 322 of FIG. 3). When in possession of the public key, the server node may verify whether the information it extracts from the message (i.e. cell identification and possibly time stamp) correspond to the signed information.

In this scenario, it is desirable that the server node is able to trust the public key it receives from the MNO. It can achieve this trust in different ways. For example, either a secure channel may be used as in the symmetric case, or the MNO may transmit a public key certificate signed with the private key matching the public key of a root certificate known to the server node. The server node can then verify the public key of the network node using the known root certificate. The provision of the public key may be executed for each verification, or may be performed more seldom.

In an alternative where the signaling between the server node and the MNO is not necessary at all, the public key is also known to the network node. The network node may keep the public key certificate signed with the private key matching the public key of a root certificate known to the server node. Then, the server node may verify the public key of the network node using the known root certificate and does not have to request the public key from the MNO.

Verification of the second position indication (compare with steps 250 and 350 of FIGS. 2 and 3, respectively) may be performed in a corresponding manner and will not be elaborated on further.

Figure 5:
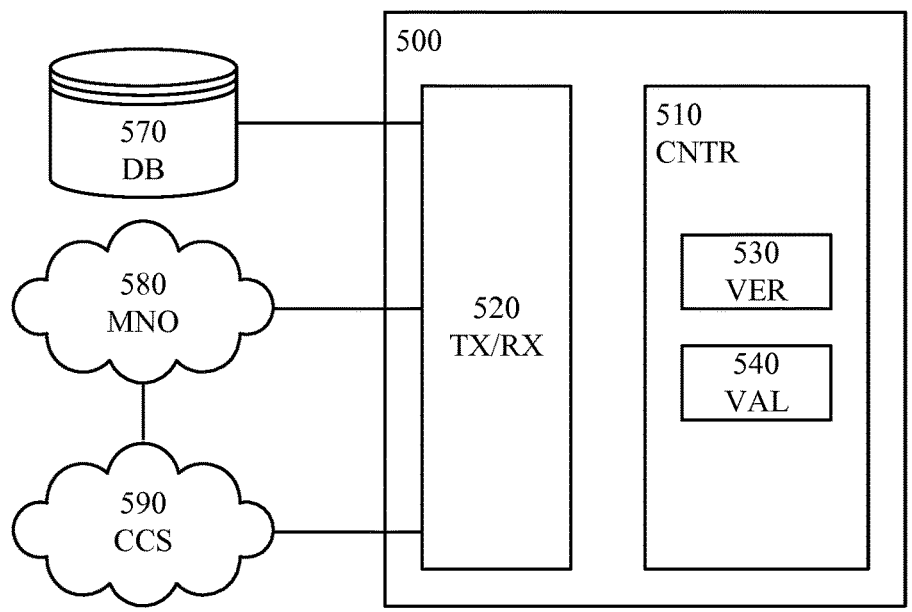
FIG. 5 is a schematic block diagram illustrating an example arrangement according to some embodiments.

FIG. 5 schematically illustrates an example arrangement according to some embodiments. The arrangement is for incorporation in a server node 500 associated with a cellular communication system, and for validation of a first position indication of a wireless communication device. Generally, the arrangement may be adapted to perform any of the various methods described herein, for example, the methods disclosed in connection with FIGS. 2, 3 and 4.

The arrangement comprises a controller (CNTR) 510 adapted to cause obtaining of a serving cell identification of the wireless communication device (compare with 220, 315), obtaining of a second position indication of the wireless communication device based on the serving cell identification (compare with 240, 340), and determination of whether the first position indication is valid based on whether a metric based on the first and second position indications meets a validation criterion (compare with 260, 270, 280, 360).

The server node is connected to a cellular communication system (CCS) 590, an MNO 580, and possibly an external database (DB) 570 via one or more transceivers, illustrated in FIG. 5 in the form of a single transceiver (TX/RX) 520.

Obtaining the serving cell identification may be achieved by a receiver 520 of the server node, receiving the serving cell identification from a network node of the CCS via a wireless communication device operating in association with the CCS.

Obtaining the second position indication may be achieved by a receiver 520 of the server node (e.g. if a database (DB) 570 adapted to map cell identifications to position indications is external to the server node) or by a database adapted to map cell identifications to position indications (e.g. if such database is comprised in the server node, not shown).

Determination of whether the first position indication is valid may be achieved by a validator (VAL) 540. The validator may, for example, be adapted to calculate the metric and compare it to a threshold as elaborated on above.

In embodiments as described above where cell identifications and/or second position indications are to be verified, the controller may comprise one or more verifiers (VER) 530 to perform the verification in cooperation with the transceiver 520 as explained above.

The transceiver 520, a database adapted to map cell identifications to position indications, the validator and/or the verifier may, or may not, be considered as comprised in the arrangement according to various embodiments.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as server node associated with a cellular communication system) comprising arrangements/circuitry/logic or performing methods according to any of the embodiments.

Figure 6:
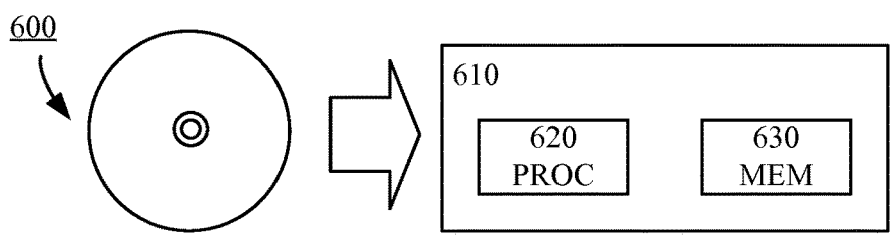
FIG. 6 is a schematic drawing illustrating a computer readable medium according to some embodiments.

According to some embodiments, a computer program product comprises a computer readable medium such as, for example, a USB-stick, a plug-in card, an embedded drive, or a read-only memory (ROM) such as the CD-ROM 600 illustrated in FIG. 6. The computer readable medium may have stored thereon a computer program comprising program instructions. The computer program may be loadable into a data-processing unit (PROC) 620, which may, for example, be comprised in a server node 610. When loaded into the data-processing unit, the computer program may be stored in a memory (MEM) 630 associated with or integral to the data-processing unit. According to some embodiments, the computer program may, when loaded into and run by the data-processing unit, cause execution of method steps according to, for example, the methods shown in any of the FIGS. 2-4.

Reference has been made herein to various embodiments. However, a person skilled in the art would recognize numerous variations to the described embodiments that would still fall within the scope of the claims. For example, the method embodiments described herein describes example methods through method steps being performed in a certain order.

However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method, performed in a server node associated with a cellular communication system, for validation of a first position indication of a wireless communication device, the first position indication obtained via the wireless communication device by a first positioning system, wherein the wireless communication device is adapted to operate in connection with the cellular communication system, the method comprising the server node:
    obtaining a serving cell identification of the wireless communication device, wherein obtaining the serving cell identification comprises:
        receiving a first message that comprises the serving cell identification and is signed by a first signature associated with the serving cell; and
        verifying the serving cell identification based on the first signature;
    obtaining a second position indication of the wireless communication device based on the serving cell identification, wherein obtaining the second position indication comprises:
        receiving a second message that comprises the second position indication and is signed by a second signature associated with a source node of the second position indication; and
        verifying the second position indication based on the second signature; and
    determining whether the first position indication is valid based on whether a metric based on the first and second position indications meets a validation criterion.

2. The method of claim 1:
    wherein the method further comprises obtaining one or more neighboring cell identifications of the wireless communication device; and
    wherein the determining whether the first position indication is valid is further based on the one or more neighboring cell identifications.

3. The method of claim 1:
    wherein the obtaining the second position indication comprises obtaining a plurality of second position indications at different points in time; and
    wherein the metric is based on the plurality of second position indications.

4. The method of claim 1, wherein the metric comprises a distance measure based on the first and second position indications.

5. The method of claim 1, wherein the validation criterion comprises the metric being less than a threshold.

6. The method of claim 1, wherein the first positioning system is a satellite based positioning system.

7. The method of claim 1, wherein the second position indication is based on a position indication corresponding to the serving cell identification in a database adapted to map cell identifications to position indications.

8. A non-transitory computer readable recording medium storing a computer program product for controlling a server node associated with a cellular communication system for validation of a first position indication of a wireless communication device, the first position indication obtained via the wireless communication device by a first positioning system, wherein the wireless communication device is adapted to operate in connection with the cellular communication system, the computer program product comprising software instructions which, when run on processing circuitry of the server node, causes the server node to:
    obtain a serving cell identification of the wireless communication device, wherein obtaining the serving cell identification comprises:
        receiving a first message that comprises the serving cell identification and is signed by a first signature associated with the serving cell; and
        verifying the serving cell identification based on the first signature;
    obtain a second position indication of the wireless communication device based on the serving cell identification, wherein obtaining the second position comprises:
        receiving a second message that comprises the second position indication and is signed by a second signature associated with a source node of the second position indication; and
        verifying the second position indication based on the second signature; and
    determine whether the first position indication is valid based on whether a metric based on the first and second position indications meets a validation criterion.

9. An arrangement for incorporation in a server node associated with a cellular communication system, the arrangement configured for validation of a first position indication of a wireless communication device, the first position indication obtained via the wireless communication device by a first positioning system, wherein the wireless communication device is adapted to operate in connection with the cellular communication system, the arrangement comprising:
    processing circuitry;
    memory containing instructions executable by the processing circuitry whereby the arrangement is operative to:
        obtain a serving cell identification of the wireless communication device, wherein the instructions are such that the arrangement is operative to obtain the serving cell identification by:
            receiving a first message that comprises the serving cell identification and is signed by a first signature associated with the serving cell; and
            verifying the serving cell identification based on the first signature;
        obtain a second position indication of the wireless communication device based on the serving cell identification, wherein the instructions are such that the arrangement is operative to obtain the second position indication by:
            receiving a second message that comprises the second position indication and is signed by a second signature associated with a source node of the second position indication; and verifying the second position indication based on the second signature; and determine whether the first position indication is valid based on whether a metric based on the first and second position indications meets a validation criterion.

10. The arrangement of claim 9:

further comprising a database adapted to map cell identifications to position indications; and wherein the instructions are such that the arrangement is operative to obtain the second position indication based on a position indication corresponding to the serving cell identification in the database.

11. A server node for a cellular communication system, the server node configured for validation of a first position indication of a wireless communication device, the first position indication obtained via the wireless communication device by a first positioning system, wherein the wireless communication device is adapted to operate in connection with the cellular communication system, the server node comprising:

processing circuitry;

memory containing instructions executable by the processing circuitry whereby the server node is operative to:

obtain a serving cell identification of the wireless communication device, wherein the instructions are such that the server node is operative to obtain the serving cell identification by:

receiving a first message that comprises the serving cell identification and is signed by a first signature associated with the serving cell; and verifying the serving cell identification based on the first signature;

obtain a second position indication of the wireless communication device based on the serving cell identification, wherein the instructions are such that the server node is operative to obtain the second position indication by:

receiving a second message that comprises the second position indication and is signed by a second signature associated with a source node of the second position indication; and verifying the second position indication based on the second signature; and determine whether the first position indication is valid based on whether a metric based on the first and second position indications meets a validation criterion.

* * * * *